United States Patent
Files et al.

(12) 
(10) Patent No.: US 11,294,438 B2
(45) Date of Patent: Apr. 5, 2022

(54) SYSTEM AND METHOD OF PROVIDING POWER FROM ONE PORTION OF AN INFORMATION HANDLING SYSTEM TO ANOTHER PORTION OF THE INFORMATION HANDLING SYSTEM

(71) Applicant: Dell Products L.P., Round Rock, TX (US)

(72) Inventors: Jace William Files, Round Rock, TX (US); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 16/862,062

(22) Filed: Apr. 29, 2020

(65) Prior Publication Data

US 2021/0341981 A1 Nov. 4, 2021

(51) Int. Cl.
*G06F 1/26* (2006.01)
*H02M 3/07* (2006.01)

(52) U.S. Cl.
CPC .............. *G06F 1/263* (2013.01); *G06F 1/266* (2013.01); *H02M 3/07* (2013.01)

(58) Field of Classification Search
CPC ........... G06F 1/263; G06F 1/266; H02M 3/07
See application file for complete search history.

(56) References Cited

U.S. PATENT DOCUMENTS

| | | | |
|---|---|---|---|
| 8,817,501 B1 * | 8/2014 | Low ...................... | H02M 3/073 363/60 |
| 9,658,666 B1 * | 5/2017 | Ghayal .................. | H02M 1/14 |
| 10,097,017 B2 * | 10/2018 | Greening ................ | G06F 1/266 |
| 10,389,159 B2 * | 8/2019 | Lahti ...................... | H02J 7/025 |
| 10,551,894 B2 * | 2/2020 | Li .......................... | G06F 1/3212 |

(Continued)

FOREIGN PATENT DOCUMENTS

| | | | | |
|---|---|---|---|---|
| EP | 2159908 A2 * | 3/2010 | ........ | H02M 3/33584 |
| WO | WO-2009060699 A1 * | 5/2009 | .............. | H02M 3/07 |

OTHER PUBLICATIONS

KA7552A/KA7553A SMPS Controller—ON Semiconductor, Oct. 2017; 6 pages, Oct. 2017.

(Continued)

*Primary Examiner* — Aurel Prifti
(74) *Attorney, Agent, or Firm* — Baker Botts L.L.P.

(57) ABSTRACT

In one or more embodiments, one or more systems, one or more methods, and/or one or more processes may: receive, by an information handling system that includes a first portion and a second portion, power from a first power supply; determine that the second portion, coupled to the first portion, requires a portion of the power from the first power supply; determine a first voltage value associated with the power from the first power supply; charge multiple capacitors of first circuitry at a first voltage associated with the first voltage value; discharge the multiple capacitors of the first circuitry to the second circuitry; charge multiple capacitors of second circuitry at a second voltage associated with a second voltage value; and discharge the multiple capacitors of the second circuitry to provide the portion of the power from the first power supply to one or more components of the second portion.

20 Claims, 11 Drawing Sheets

(56) References Cited

U.S. PATENT DOCUMENTS

| | | | |
|---|---|---|---|
| 2005/0174098 A1* | 8/2005 | Watanabe | H02M 3/07 323/282 |
| 2009/0278520 A1* | 11/2009 | Perreault | H02M 3/07 323/282 |
| 2012/0043923 A1* | 2/2012 | Ikriannikov | H02J 1/10 320/103 |
| 2016/0149428 A1* | 5/2016 | Nunami | G06F 1/263 320/136 |
| 2017/0279284 A1* | 9/2017 | Lim | H02J 7/0045 |
| 2018/0034360 A1* | 2/2018 | Hirabayashi | H02M 3/33592 |
| 2018/0341310 A1* | 11/2018 | Lambert | G06F 1/263 |
| 2019/0074698 A1* | 3/2019 | Singhal | H02J 7/00712 |
| 2019/0140456 A1* | 5/2019 | Hsu | H02J 7/00 |
| 2019/0280529 A1* | 9/2019 | Kawanami | H02J 7/342 |
| 2019/0372457 A1* | 12/2019 | Zhang | H02M 3/158 |
| 2020/0183471 A1* | 6/2020 | Liu | G06F 1/266 |
| 2020/0195136 A1* | 6/2020 | Huang | H02M 1/00 |
| 2020/0227946 A1* | 7/2020 | Mao | H02J 50/12 |
| 2020/0228016 A1* | 7/2020 | Wu | H02M 1/08 |
| 2020/0366213 A1* | 11/2020 | Watanabe | H02M 3/33584 |
| 2021/0057991 A1* | 2/2021 | McBryde | H02M 3/1582 |

OTHER PUBLICATIONS

TPS56x20 4.5V to 17V Input, 12A/9A/7A/5A Output, Synchronous Step-Down Voltage. Regulator with Voltage Scaling. Texas Instruments, Dec. 2017; 45 pages, Dec. 2017.

* cited by examiner

| Function | Ratio | Phase | S1 | S2 | S3 | S4 | S5 | S6 | S7 | S8 | S9 | S10 | S11 | S12 | S13 | S14 | S15 | S16 | S17 | S18 | S19 | S20 | S21 | S22 | S23 |
|---|---|---|---|---|---|---|---|---|---|---|---|---|---|---|---|---|---|---|---|---|---|---|---|---|---|
| Multiplier | 1:4 | Charge | C | O | C | C | C | C | O | O | O | O | O | O | O | O | O | O | O | O | O | C | C | C | C |
| | | Discharge | O | O | O | O | O | O | O | O | C | C | C | O | C | O | O | O | C | C | O | C | O | O | O |
| | 1:3 | Charge | C | O | C | C | C | C | O | O | O | O | O | O | O | O | O | O | O | O | O | C | C | C | C |
| | | Discharge | O | O | O | O | O | O | O | O | C | C | C | O | O | O | O | O | O | C | O | C | C | O | O |
| | 1:2 | Charge | C | O | C | C | C | C | O | O | O | O | O | O | O | O | O | O | O | O | O | C | C | C | C |
| | | Discharge | O | O | O | O | O | O | C | O | C | O | O | O | C | O | C | O | C | C | O | C | O | C | O |
| Divider | 4:1 | Charge | C | O | C | O | O | O | O | O | C | C | O | O | C | O | O | O | O | O | C | O | O | O | O |
| | | Discharge | O | O | O | O | O | O | O | O | O | O | O | O | O | C | C | C | C | C | O | C | C | C | C |
| | 2:1 | Charge | C | O | C | O | O | O | O | O | C | C | O | O | C | O | O | O | O | O | C | O | O | O | O |
| | | Discharge | O | O | O | O | O | O | O | O | C | O | O | O | C | O | C | O | C | O | O | C | O | C | O |
| | 4:3 | Charge | C | O | C | O | O | O | O | O | C | C | O | O | C | O | O | O | O | O | C | O | O | O | O |
| | | Discharge | O | O | O | O | O | O | O | O | C | C | C | O | O | O | O | C | C | O | O | C | C | O | O |

FIG. 3B

SYSTEM AND METHOD OF PROVIDING POWER FROM ONE PORTION OF AN INFORMATION HANDLING SYSTEM TO ANOTHER PORTION OF THE INFORMATION HANDLING SYSTEM

BACKGROUND

Field of the Disclosure

This disclosure relates generally to information handling systems and more particularly to providing power from one portion of an information handling system to another portion of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by an information handling system that includes a first portion and a second portion, power from a first power supply; may determine that the second portion of the information handling system, coupled to the first portion of the information handling system, requires a portion of the power from the first power supply; may determine a first voltage value associated with the power from the first power supply; may determine, based at least on the first voltage value, a second voltage value, greater than the first voltage value; may configure, based at least on the first voltage value and based at least on the second voltage value, multiple switches of first circuitry of the first portion of the information handling system for charging multiple capacitors of the first circuitry; may charge the multiple capacitors of the first circuitry at a first voltage associated with the first voltage value; may configure, based at least on the second voltage value, multiple switches of second circuitry of the second portion of the information handling system for charging multiple capacitors of the second circuitry; may configure, based at least on the first voltage value and based at least on the second voltage value, the multiple switches of the first circuitry for discharging the multiple capacitors of the first circuitry; may discharge the multiple capacitors of the first circuitry to the second circuitry; may charge the multiple capacitors of the second circuitry at a second voltage associated with the second voltage value; may configure, based at least on the second voltage value, the multiple switches of the second circuitry for discharging the multiple capacitors of the second circuitry; and may discharge the multiple capacitors of the second circuitry to provide the portion of the power from the first power supply to one or more components of the second portion of the information handling system.

In one or more embodiments, configuring, based at least on the second voltage value, the multiple switches of the second circuitry for discharging the multiple capacitors of the second circuitry is further based at least on a third voltage value, less than the second voltage value. In one or more embodiments, discharging the multiple capacitors of the second circuitry to provide the portion of the power from the first power supply to the one or more components of the second portion of the information handling system may include discharging the multiple capacitors of the second circuitry to provide the portion of the power from the first power supply at a third voltage associated with the third voltage value. In one example, the third voltage value may be the first voltage value. In another example, the third voltage value may be different from the first voltage value. In one or more embodiments, the first portion of the information handling system may include the first power supply. In one or more embodiments, the first power supply may include a battery. In one or more embodiments, the one or more components of the second portion of the information handling system may include a second power supply that includes a battery.

In one or more embodiments, configuring, based at least on the first voltage value and based at least on the second voltage value, the multiple switches of the first circuitry of the first portion of the information handling system for charging the multiple capacitors of the first circuitry may include configuring the multiple switches of the first circuitry for charging the plurality of capacitors of the first circuitry in parallel. In one or more embodiments, configuring, based at least on the second voltage value, the multiple switches of the second circuitry of the second portion of the information handling system for charging the multiple capacitors of the second circuitry may include configuring the multiple switches of the second circuitry for charging the multiple capacitors of the second circuitry in series. In one or more embodiments, configuring, based at least on the second voltage value, the multiple switches of the second circuitry for discharging the multiple capacitors of the second circuitry may include configuring the multiple switches of the second circuitry for discharging the multiple capacitors of the second circuitry in parallel. In one or more embodiments, the one or more systems, the one or more methods, and/or the one or more processes may further provide, via a second power supply of the second portion of the information handling system, at least a second portion of power to the one or more components of the second portion of the information handling system.

In one or more embodiments, the one or more systems, the one or more methods, and/or the one or more processes may further receive, by the second portion of the information handling system, second power from a second power supply; may further determine that the first portion of the information handling system requires a portion of the power from the second power supply; may further determine a third voltage value associated with a third voltage associated with the second power; may further determine, based at least on the third voltage value, a fourth voltage value, greater than the third voltage value; may further configure, based at least on the third voltage value and based at least on the fourth voltage value, the multiple switches of the second circuitry for charging the multiple capacitors of the second circuitry; may further charge the multiple capacitors of the second circuitry at a fourth voltage associated with the fourth voltage value; may further configure, based at least on the fourth voltage value, the multiple switches of the first circuitry for charging the multiple capacitors of the first circuitry; may further configure, based at least on the third voltage value and based at least on the fourth voltage value, the multiple switches of the second circuitry for discharging the multiple capacitors of the second circuitry; may further discharge the multiple capacitors of the second circuitry to the first circuitry; may further charge the multiple capacitors of the first circuitry at a fourth voltage associated with the fourth voltage value; may further configure, based at least on the fourth voltage value, the multiple switches of the first circuitry for discharging the multiple capacitors of the first circuitry; and may further discharge the multiple capacitors of the first circuitry to provide the portion of the power from the second power supply to one or more components of the first portion of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 3B illustrates an example of a table that includes switch configurations, according to one or more embodiments;

DETAILED DESCRIPTION

Figure 1A:
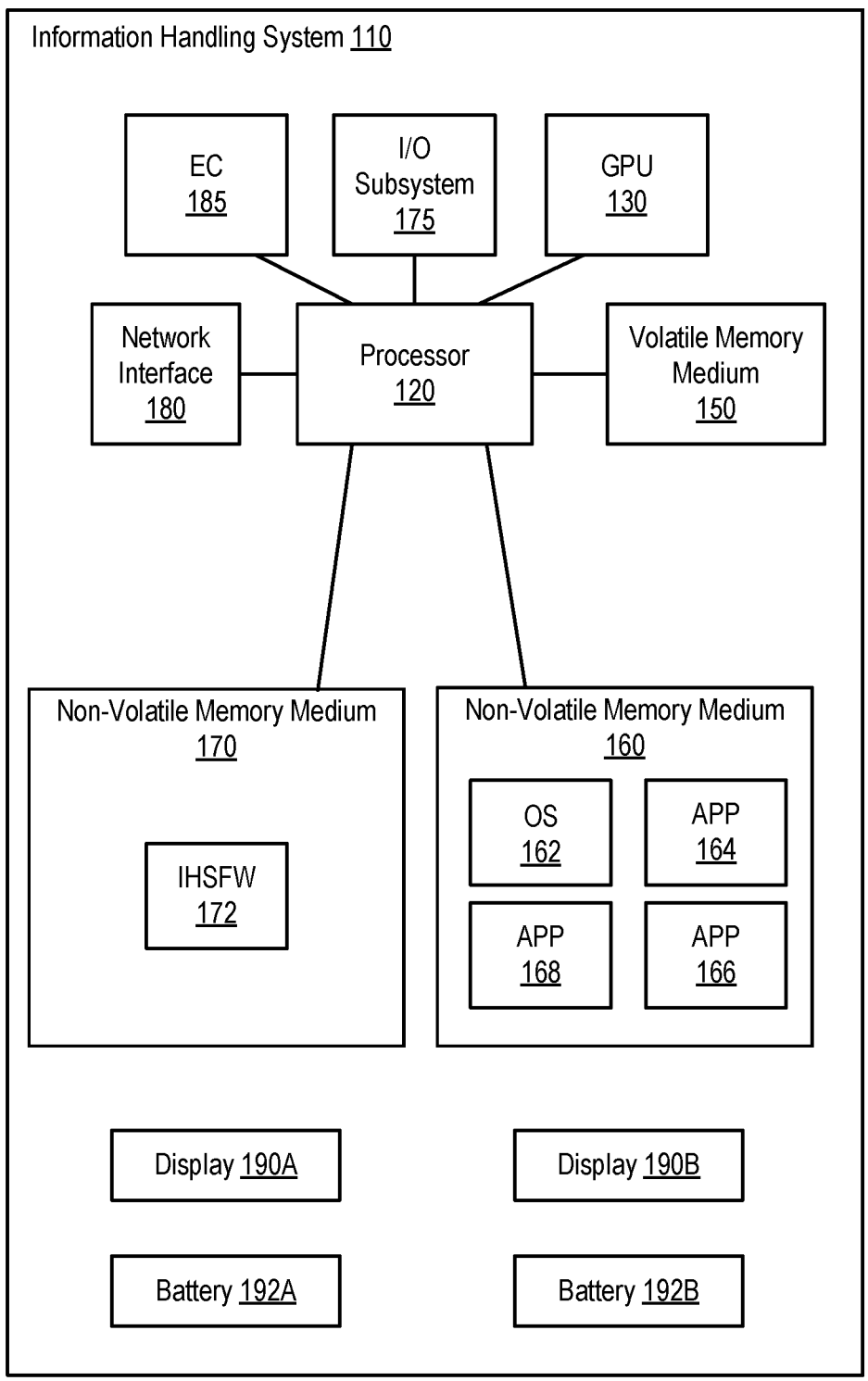
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, power may be provided across a hinge of an information handling system that includes one or more displays. For example, power may be provided across a hinge that couples two displays of the information handling system. In one or more embodiments, input voltage from a power supply to the information handling system may vary. For example, the input voltages may include five volts (5V), twelve volts (12V), and twenty volts (20V), among others. For instance, the input voltages may be direct current (DC). In one or more embodiments, input power may be received by the information handling system via a port included in a chassis of the information handling system. In one example, input power may be received by the information handling system via a first port included in a first chassis of the information handling system. For instance, the first chassis may include a display. In another example, input power may be received by the information handling system via a second port included in a second chassis of the information handling system. For instance, the second chassis may include a second display.

In one or more embodiments, the information handling system may distribute power to its components at one or more voltages. In one example, a backlight driver of a display of the information handling system may utilize a higher voltage than a processor of the information handling system. In another example, the backlight driver may utilize a higher voltage than a voltage provided by an external power supply or provided by an internal power supply. In one or more embodiments, one or more components of the information handling system may dynamically provide power at one or more voltages based at least on one or more voltages provided by an external power supply and/or provided by an internal power supply.

In one or more embodiments, an internal power supply may include a battery. In one or more embodiments, a chassis of the information handling system may include an internal power supply. In one example, the first chassis of the information handling system may include a first power supply. In another example, the second chassis of the information handling system may include a second power supply. In one or more embodiments, the first chassis of the information handling system may include a first portion of components of the information handling system, and the second chassis of the information handling system may include a second portion of components of the information handling system. In one example, power may be transmitted from the first chassis to the second chassis. In a second example, power may be transmitted from the second chassis to the first chassis. In a third example, power may be received by the first chassis from the second chassis. In another example, power may be received by the second chassis from the first chassis.

In one or more embodiments, power at a first voltage, DC, may be increased to a second voltage, DC, before providing the power to a chassis. In one example, providing the power at the second voltage, greater than the first voltage, may reduce power loss in power transmission. For instance, providing the power at the second voltage, greater than the first voltage, may reduce an amount of current to provide the power or to provide an amount of power slightly less than the power. In another example, providing the power at the second voltage, greater than the first voltage, may reduce an amount of conductor material to transmit power. For instance, reducing an amount of conductor material to transmit power may provide one or more environmental benefits. In one or more embodiments, power at the second voltage may be decreased to the first voltage after receiving the power from a chassis. For example, decreasing the power from the second voltage to the first voltage may include increasing a current. For instance, a power value may be a voltage value multiplied a current value.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a graphics processing unit (GPU) 130, a volatile memory medium 150, non-volatile memory media 160 and 170, an I/O subsystem 175, a network interface 180, and an embedded controller (EC) 185. As illustrated, GPU 130, volatile memory medium 150, non-volatile memory media 160 and 170, I/O subsystem 175, network interface 180, and EC 185 may be communicatively coupled to processor 120.

In one or more embodiments, one or more of volatile memory medium 150, non-volatile memory media 160 and 170, I/O subsystem 175, network interface 180, and EC 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and EC 185 may be communicatively coupled to processor 120 via one or more PCI-Express (PCIe) root complexes. In another example, one or more of an I/O subsystem 175, network interface 180, EC 185 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In a second instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). In one example, the SoC may include processor 120 and a platform controller hub (not specifically illustrated). In another example, the SoC may include processor 120 and a micro controller. For example, the micro controller of the SoC may include one or more structures and/or one or more functionalities of those described with reference to EC 185.

In one or more embodiments, EC 185 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 185 may be or include an application processor. In one example, EC 185 may be or include an ARM Cortex-A processor. In another example, EC 185 may be or include an Intel Atom processor. In one or more embodiments, EC 185 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated, IHS 110 may include displays 190A and 190B. Although not specifically illustrated, displays 190A and 190B may be communicatively coupled to GPU 130, according to one or more embodiments. As shown, IHS 110 may include batteries 192A and 192B. In one or more embodiments, one or more of batteries 192A and 192B may provide power to one or more components of IHS 110. For example, one or more of batteries 192A and 192B may provide power to one or more of processor 120, volatile memory medium 150, non-volatile memory medium 160, non-volatile memory medium 170, I/O subsystem 175, network interface 180, display 190A, and display 190B, among others. In one or more embodiments, one or more of batteries 192A and 192B may provide power to one or more peripheral devices coupled to IHS 110.

Figure 1B:
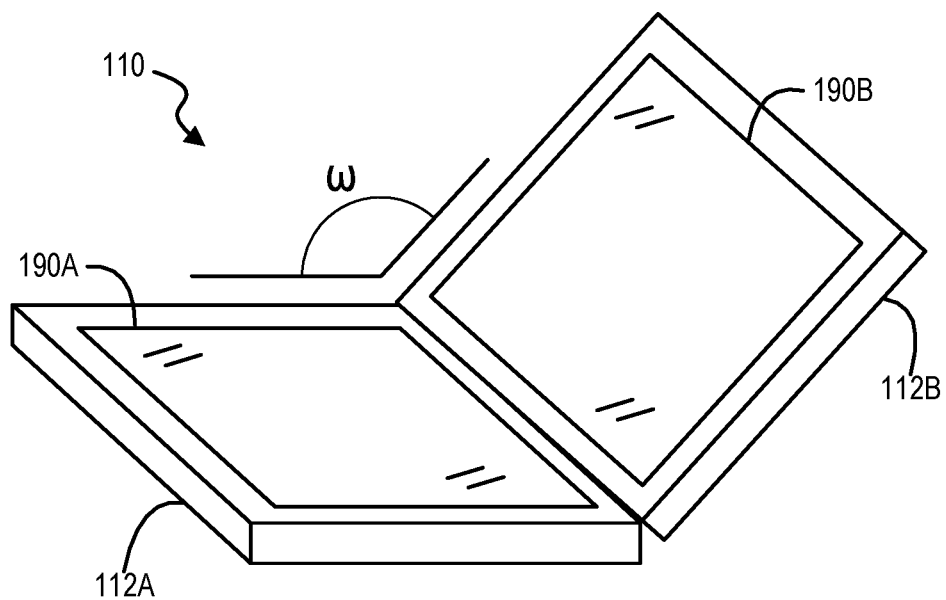
FIG. 1B illustrates a second example of an information handling system, according one or more embodiments.

Turning now to FIG. 1B, a second example of an information handling system is illustrated, according one or more embodiments. As shown, IHS 110 may include a portion 112A and a portion 112B. In one example, portion 112A may include a first chassis of IHS 110. In another example, portion 112B may include a second chassis of IHS 110. In one or more embodiments, the first chassis and the second chassis may be coupled to each other via one or more hinges.

As illustrated, portion 112A may include display 190A. As shown, portion 112B may include display 190B. As illustrated, portion 112A may be at an angle co to portion 112B. In one or more embodiments, angle ω may vary. In one example, angle ω may vary from zero degrees (0°) to one hundred and eighty degrees (180°). In another example, angle ω may vary from zero degrees (0°) to three hundred and sixty degrees (360°).

Figure 1C:
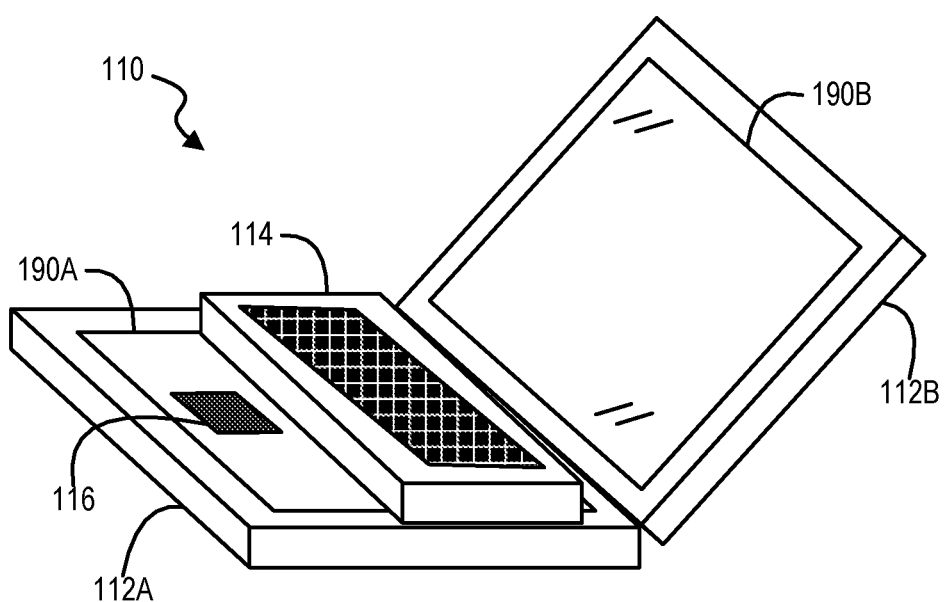
FIG. 1C illustrates a third example of an information handling system, according one or more embodiments.

Turning now to FIG. 1C, a third example of an information handling system is illustrated, according one or more embodiments. As shown, a keyboard 114 may be placed on display 190A. In one or more embodiments, keyboard 114 may be coupled IHS 110. In one example, keyboard 114 may be coupled IHS 110 in a wired fashion. In another example, keyboard 114 may be coupled IHS 110 in a wireless fashion. In one or more embodiments, keyboard 114 may include mechanical keys. As illustrated, display 190A may display a touchpad 116. For example, touchpad 116 may be utilized as a pointing device. In one or more embodiments, a display 190 may include a touch screen.

Figure 1D:
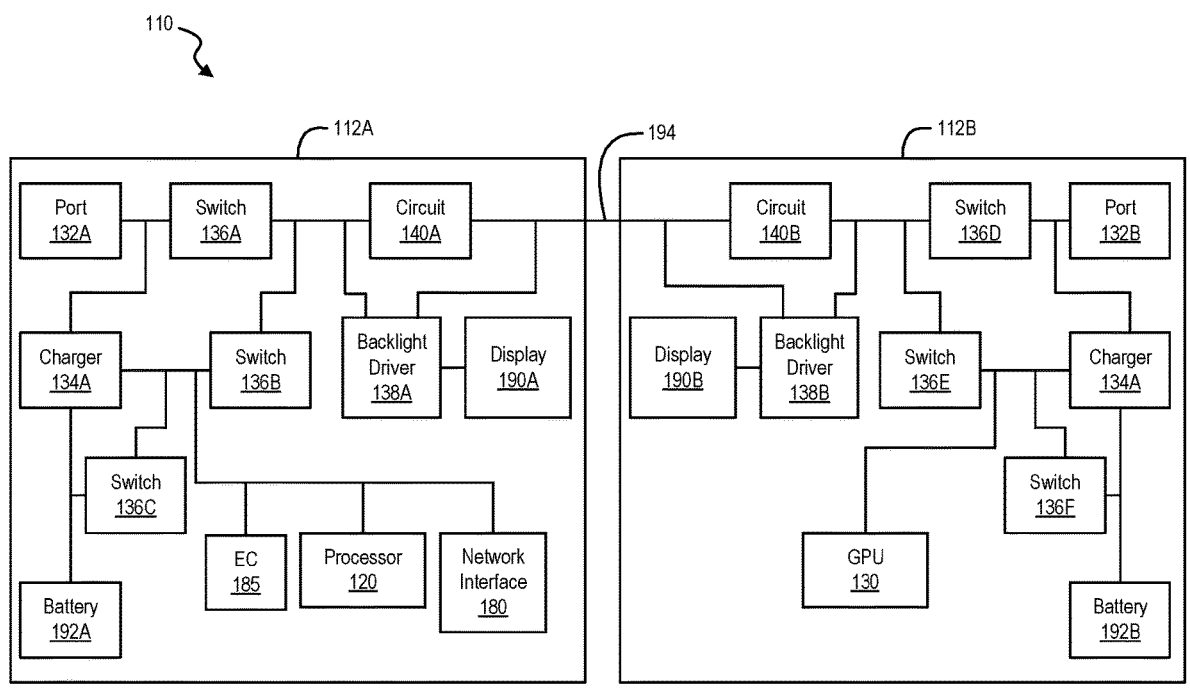
FIG. 1D illustrates a fourth example of an information handling system, according to one or more embodiments.

Turning now to FIG. 1D, a fourth example of an information handling system is illustrated, according to one or more embodiments. As shown, portion 112A may include processor 120, a port 132A, a charger 134A, switches 136A-136C, a backlight driver 138A, circuitry 140A, network interface 180, EC 185, display 190A, and battery 192A. As illustrated, portion 112B may include GPU 130, a port 132B, a charger 134B, switches 136D-136F, a backlight driver 138B, circuitry 140B, and battery 192B. In one or more embodiments, a switch 136 may include one or more transistors. In one example, a switch 136 may include one or more transistors bipolar junction transistors. In another example, a switch 136 may include one or more field effect transistors. In one instance, a field effect transistor may include a junction field effect transistor. In another instance, a field effect transistor may include a metal-oxide-semiconductor field effect transistor. In one or more embodiments, one or more switches 136 may direct power distribution in a portion 112 of IHS 110. In one or more embodiments, a charger 134 may be charge a battery 192.

As shown, portion 112A may be coupled to portion 112B via a bus 194. In one or more embodiments, bus 194 may include a hinge bus. In one or more embodiments, bus 194 may transport electrical power between portions 112A and 112B. Although FIG. 1C illustrates couplings of power distribution, a component of portion 112A or portion 112B may provide control signals to one or more components of portion 112A and/or to one or more components of portion 112B. In one example, EC 185 may provide control signals to circuitry 140A. In another example, bus 194 may transport one or more signals between portions 112A and 112B. For instance, EC 185 may provide control signals to circuitry 140B. In one or more embodiments, EC 185 may provide control signals to circuitry 140B via bus 194.

In one or more embodiments, a port 132 may be utilized for data communication, for power transmission, and/or for power reception. For example, a port 132 may include one or more of an IEEE 1394 interface, a FireWire interface, a USB interface, and a Thunderbolt interface, among others. In one or more embodiments, a port 132 may operate with multiple voltages. For example, the multiple voltages may include five volts (5V), twelve volts (12V), and twenty volts (20V), among others. For instance, a port 132 may include a USB Type-C interface.

Figure 1E:
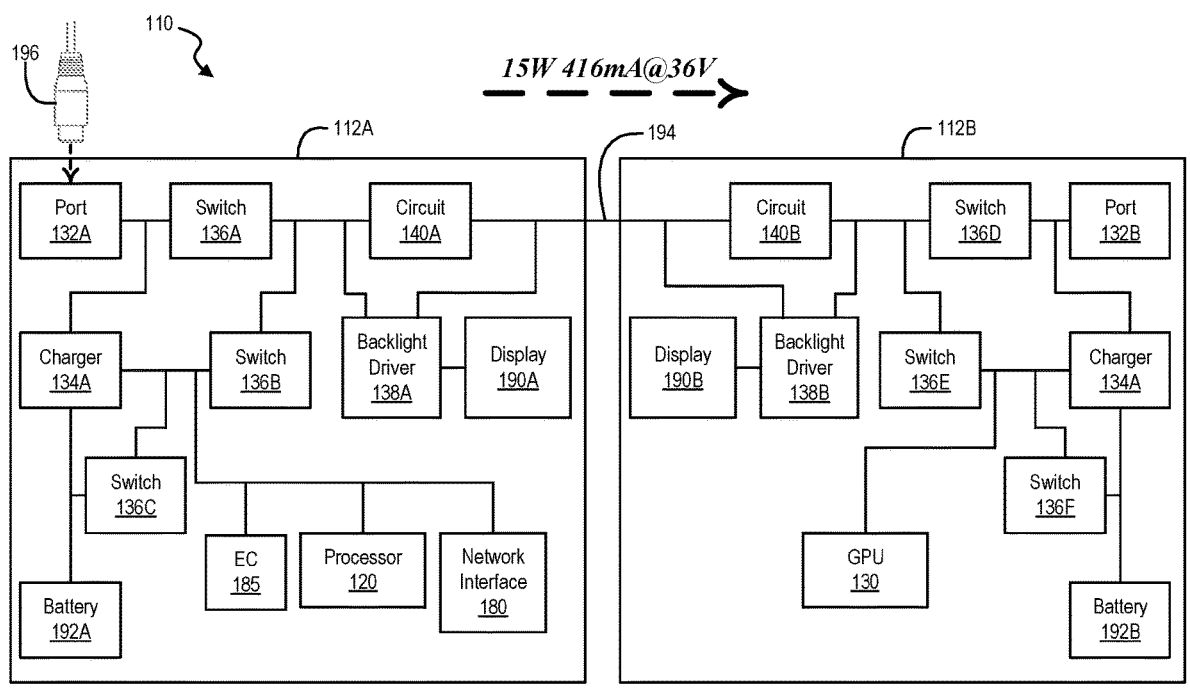
FIG. 1E, illustrates a fifth example of an information handling system, according to one or more embodiments.

Turning now to FIG. 1E, a fifth example of an information handling system is illustrated, according to one or more embodiments. As shown, a connector 196 may be coupled with port 132A. For example, connector 196 may provide power to port 132A. For instance, IHS 110 may receive power via port 132A from connector 196. In one or more embodiments, connector 196 may include a USB Type C connector, and port 132A may include a USB Type C port. As an example, connector 196 may provide the power at twelve volts (12V). In this example, switches 136A-136C, 136E, and 136F may be closed (e.g., low impedance), and switch 136D may be open (e.g., high impedance). For instance, GPU 130 may be powered and/or battery 192B may be charged. In one or more embodiments, portion 112B may receive power via bus 194.

In one or more embodiments, circuit 140A may receive at least a portion of the power from connector 196 at twelve volts (12V). For example, the at least the portion of the power from connector 196 may be fifteen Watts (15 W). As shown, circuit 140A may increase the twelve volts (12V) from the at least the portion of the power from connector 196 to thirty-six volts (36V). In this example, the current associated with the at least the portion of the power from connector 196 may be twelve hundred fifty milliamperes (1250 mA). As illustrated, circuit 140A may decrease the current to four hundred and sixteen milliamperes (416 mA). Bus 194 may transport the at least the portion of the power from connector 196 to one or more of circuit 140B and backlight driver 138B. For instance, bus 194 may transport the fifteen Watts (15 W) of power via four hundred and sixteen milliamperes (416 mA) at thirty-six volts (36V). In one or more embodiments, 140B may decrease the thirty-six volts (36V) to twelve volts (12V) before providing power to other components of portion 112B. Circuit 140B may provide up to twelve hundred fifty milliamperes (1250 mA) of current to the other components of portion 112B, based at least on how much power backlight driver 138B consumes.

Figure 1F:
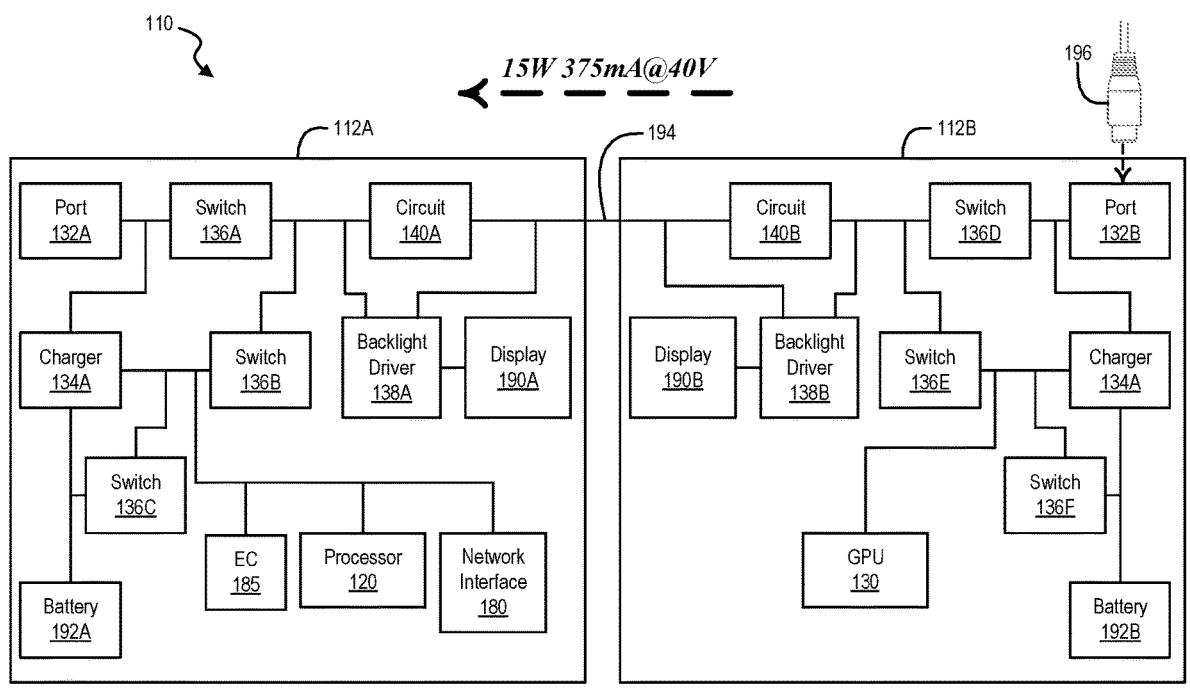
FIG. 1F, illustrates another example of an information handling system, according to one or more embodiments.

Turning now to FIG. 1F, another example of an information handling system is illustrated, according to one or more embodiments. As shown, connector 196 may be coupled with port 132B. For example, connector 196 may provide power to port 132B. For instance, IHS 110 may receive power via port 132B from connector 196. In one or more embodiments, connector 196 may include a USB Type C connector, and port 132B may include a USB Type C port. As an example, connector 196 may provide the power at twenty volts (20V). In this example, switches 136B, 136C, and 136D-136F may be closed (e.g., low impedance), and switch 136A may be open (e.g., high impedance). For instance, portion 112A may receive power from connector 196 via port 132B, and/or batteries 192A and 192B may be charged. In one or more embodiments, portion 112A may receive power via bus 194.

In one or more embodiments, circuit 140B may receive at least a portion of the power from connector 196 at twenty volts (20V). For example, the at least the portion of the power from connector 196 may be fifteen Watts (15 W). As shown, circuit 140B may increase the twenty volts (20V) from the at least the portion of the power from connector 196 to forty volts (40V). In this example, the current associated with the at least the portion of the power from connector 196 may be seven hundred fifty milliamperes (750 mA). As illustrated, circuit 140B may decrease the current to three hundred and seventy-five milliamperes (375 mA). Bus 194 may transport the at least the portion of the power from connector 196 to one or more of circuit 140A and backlight driver 138A. For instance, bus 194 may transport the fifteen Watts (15 W) of power via three hundred and seventy-five milliamperes (375 mA) at forty volts (40V). In one or more embodiments, 140A may decrease the forty volts (40V) to ten volts (10V) before providing power to other components of portion 112A. Circuit 140A may provide up to fifteen hundred fifty milliamperes (1500 mA) of current to the other components of portion 112A, depending on how much power backlight driver 138A consumes. In one or more embodiments, battery 192A may be charged, based at least on how much power processor 120 utilizes. For example, battery 192A may be charged, based at least on a workload being processed by processor 120.

Figure 2:
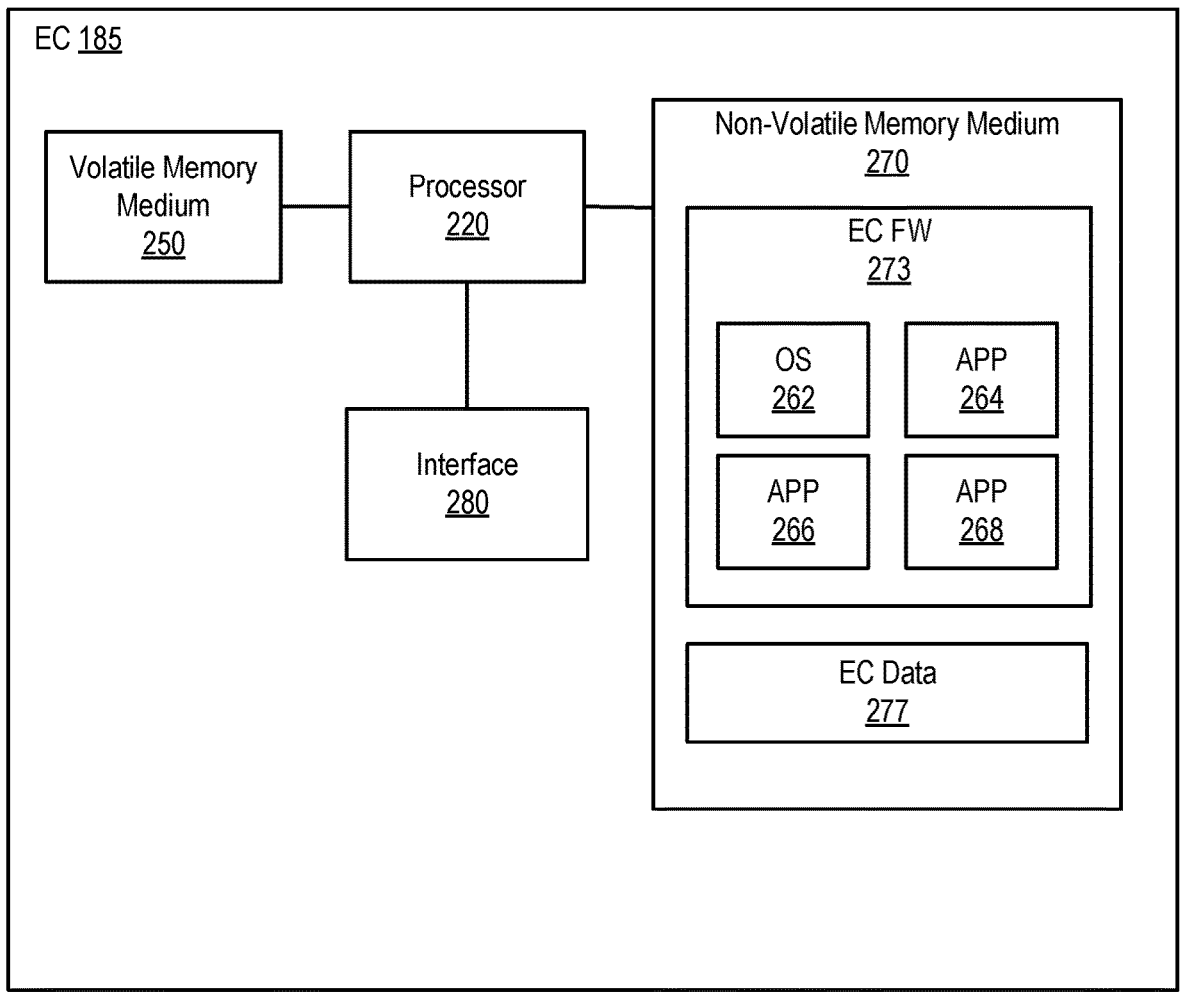
FIG. 2 illustrates an example of an embedded controller, according to one or more embodiments.

Turning now to FIG. 2, an example of an embedded controller is illustrated, according to one or more embodiments. As shown, EC 185 may include a processor 220, a volatile memory medium 250, a non-volatile memory medium 270, and an interface 280. As illustrated, non-volatile memory medium 270 may include an EC firmware (FW) 273, which may include an OS 262 and APPs 264-268, and may include EC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
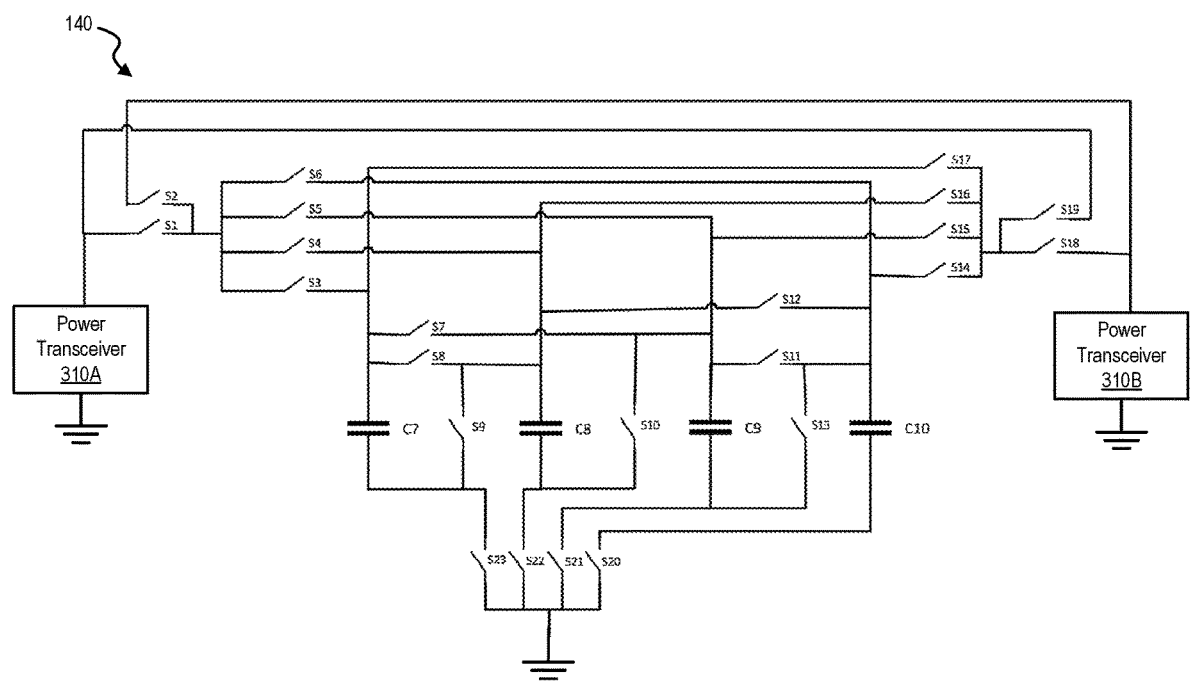
FIG. 3A illustrates an example of circuitry and current transceivers, according to one or more embodiments.

Turning now to FIG. 3A, an example of circuitry and current transceivers is illustrated, according to one or more embodiments. As shown, circuitry 140 may include switches S1-S23. As illustrated, circuitry 140 may include capacitors C7-C10. In one or more embodiments, a power transceiver 310A may include one or more of processor 120, port 132A, charger 134A, switches 136A-136C, backlight driver 138A, circuitry 140A, network interface 180, EC 185, display 190A, and battery 192A, among others. In one or more embodiments, a power transceiver 310B may include one or more of GPU 130, port 132B, charger 134B, switches 136D-136F, backlight driver 138B, circuitry 140B, and battery 192B, among others. In one example, power transceiver 310A may provide power to power transceiver 310B. For instance, power transceiver 310B may receive the power from power transceiver 310A. In another example, power transceiver 310B may provide power to power transceiver 310A. For instance, power transceiver 310A may receive the power from power transceiver 310B.

In one or more embodiments, a switch of switches S1-S23 may include one or more transistors. In one example, a switch of switches S1-S23 may include one or more transistors bipolar junction transistors. In another example, a switch of switches S1-S23 may include one or more field effect transistors. In one instance, a field effect transistor may include a junction field effect transistor. In another instance, a field effect transistor may include a metal-oxide-semiconductor field effect transistor. As illustrated, circuitry 140 may not include an inductor. In one or more embodiments, circuitry 140 may be configured without an inductor.

In one or more embodiments, when power transceiver 310A provides power to power transceiver 310B, circuitry 140A may increase a voltage, from a first voltage to a second voltage, associated with power and may provide the power to circuitry 140B. In one example, circuitry 140B may decrease the second voltage to the first voltage. In another example, circuitry 140B may decrease the second voltage to a third voltage, less than the second voltage. In one or more embodiments, when power transceiver 310B provides power to power transceiver 310A, circuitry 140B may increase a voltage, from a first voltage to a second voltage, associated with power and may provide the power to circuitry 140A. In one example, circuitry 140A may decrease the second voltage to the first voltage. In another example, circuitry 140A may decrease the second voltage to a third voltage, less than the second voltage.

In one or more embodiments, circuitry 140 may increase a first voltage of power to a second voltage of the power by a ratio. For example, the ratio may include 1:4, 1:2, or 1:3, among others. In one instance, EC 185 may configure circuitry 140 with the ratio. In another instance, a micro controller of a SoC may configure circuitry 140 with the ratio. In one or more embodiments, circuitry 140 may decrease a first voltage of power to a second voltage of the power by a ratio. For example, the ratio may include 4:1, 2:1, or 4:3, among others. In one instance, EC 185 may configure circuitry 140 with the ratio. In another instance, a micro controller of a SoC may configure circuitry 140 with the ratio.

In one or more embodiments, each of switches S1-S23 of circuitry 140 may be configured to be open (O) or closed (C) to increase a first voltage of power to a second voltage of the power by a ratio, as illustrated by a table 320 in FIG. 3B. For example, each of switches S1-S23 of circuitry 140A may be configured to be open (O) or closed (C) to increase the first voltage of power to the second voltage of the power by a ratio of 1:4. In one instance, switches S1-S23 of circuitry 140A may be configured in accordance with a row 322 to charge circuitry 140 associated with a ratio of 1:4. In another instance, switches S1-S23 of circuitry 140A may be configured in accordance with a row 324 to discharge circuitry 140 associated with a ratio of 1:4. As an example, circuitry 140A may be discharged to circuitry 140B. For instance, circuitry 140A may be discharged with an output voltage of four times an input voltage.

In one or more embodiments, each of switches S1-S23 of circuitry 140 may be configured to be configured to be open (O) or closed (C) to decrease the second voltage of the power to the first voltage of the power by the ratio, as illustrated by table 320 in FIG. 3B. For example, each of switches S1-S23 of circuitry 140B may be configured to be open (O) or closed (C) to decrease the second voltage of power to the first voltage of the power by a ratio of 4:1. In one instance, switches S1-S23 of circuitry 140B may be configured in accordance with a row 326 to charge circuitry 140B associated with a ratio of 4:1. As an example, circuitry 140B may be charged from circuitry 140A. In another instance, switches S1-S23 of circuitry 140B may be configured in accordance with a row 328 to discharge circuitry 140B associated with a ratio of 4:1. As an example, circuitry 140B may discharge to provide power to one or more of components of portion 112B. For instance, circuitry 140B may discharge to provide power to one or more of GPU 130, port 132B, charger 134B, switches 136D-136F, backlight driver 138B, circuitry 140B, and battery 192B, among others. As another example, circuitry 140B may be discharged with an output voltage of one-fourth an input voltage.

In one or more embodiments, each of switches S1-S23 of circuitry 140B may be configured to be open (O) or closed (C) to increase the first voltage of power to the second voltage of the power by a ratio of 1:4. In one example, switches S1-S23 of circuitry 140B may be configured in accordance with row 322 to charge circuitry 140 associated with a ratio of 1:4. In another example, switches S1-S23 of circuitry 140B may be configured in accordance with row 324 to discharge circuitry 140 associated with a ratio of 1:4. For instance, circuitry 140B may be discharged to circuitry 140A. In one or more embodiments, when the first voltage of the power is increased to the second voltage of the power by a ratio of 1:4, a first current associated with the power may be decreased to a second current associated with the power. For example, the second current may be one-fourth the first current. For instance, the second voltage may be four times the first voltage, and the second current may be one-fourth the first current.

In one or more embodiments, each of switches S1-S23 of circuitry 140 may be configured to be configured to be open (O) or closed (C) to decrease the second voltage of the power to the first voltage of the power by the ratio, as illustrated by table 320. For example, each of switches S1-S23 of circuitry 140A may be configured to be open (O) or closed (C) to decrease the second voltage of power to the first voltage of the power by a ratio of 4:1. In one instance, switches S1-S23 of circuitry 140A may be configured in accordance with a row 326 to charge circuitry 140A associated with a ratio of 4:1. As an example, circuitry 140A may be charged from circuitry 140B. In another instance, switches S1-S23 of circuitry 140A may be configured in accordance with row 328 to discharge circuitry 140A associated with a ratio of 4:1. As an example, circuitry 140A may discharge to provide power to one or more of components of portion 112A. For instance, circuitry 140A may discharge to provide power to one or more of processor 120, port 132A, charger 134A, switches 136A-136C, backlight driver 138A, network interface 180, EC 185, display 190A, and battery 192A, among others.

Figure 3C:
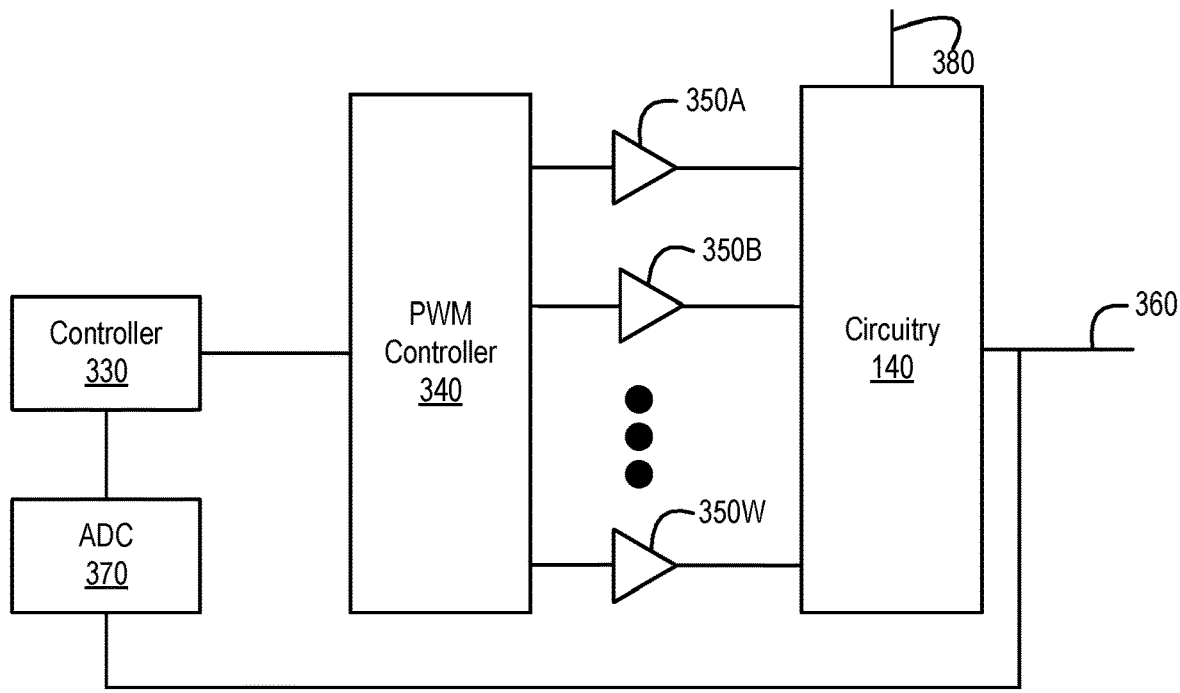
FIG. 3C illustrates an example of components to provide power, according to one or more embodiments.

Turning now to FIG. 3C, an example of a components to provide power is illustrated, according to one or more embodiments. As shown, a controller 330 may be coupled to a pulse width modulation (PWM) controller 340. In one example, EC 185 may include controller 330. For instance, controller 330 may be implemented via EC 185. In another example, a micro controller of a SoC may include controller 330. For instance, controller 330 may be implemented via the micro controller of the SoC. In one or more embodiments, controller 330 may provide one or more configuration signals to PWM controller 340. For example, PWM controller 340 may receive the one or more configuration signals from controller 330. For instance, PWM controller 340 may be configured based at least on the one or more configuration signals from controller 330. In one or more embodiments, controller 330 may provide one or more configuration signals to PWM controller 340 via a bus described herein. For example, controller 330 may provide one or more configuration signals to PWM controller 340 via protocol of a bus described herein. In one or more embodiments, controller 330 may provide one or more configuration signals to PWM controller 340 via GPIO. In one or more embodiments, controller 330 may provide one or more configuration signals to PWM controller 340 in a serial fashion. In one or more embodiments, controller 330 may provide one or more configuration signals to PWM controller 340 in a parallel fashion.

In one or more embodiments, PWM controller 340 may be configured to produce one or more PWM signals. In one example, a PWM signal may be associated with a frequency. For instance, a PWM frequency may include a frequency of 500 kHz to 10 MHz, among others. In another example, a PWM signal may be associated with a duty cycle. For instance, a duty cycle may be from ten percent (10%) to ninety percent (90%), among others. As illustrated, PWM controller 340 may be coupled to amplifiers 350A-350W. For example, PWM controller 340 may provide output signals to amplifiers 350A-350W.

As shown, amplifiers 350A-350W may be coupled to circuitry 140. For example, amplifiers 350A-350W may amplify the output signals from PWM controller 340. For instance, amplifiers 350A-350W may be provided amplified output signals from PWM controller 340 to circuitry 140. In one or more embodiments, amplifiers 350A-350W may be respectively coupled to switches S1-S23. As illustrated, circuitry 140 may provide an output 360. In one example, output 360 may be provided to bus 194. In another example, bus 194 may include output 360.

As shown, an analog to digital converter (ADC) 370 may be coupled to output 360. In one or more embodiments, ADC 370 may convert analog voltages to digital values. As illustrated, ADC 370 may be coupled to controller 330. For example, ADC 370 may provide digital values, associated with voltages of output 360, to controller 330. For instance, controller 330 may receive digital values, associated with voltages of output 360, from ADC 370. In one or more embodiments, controller 330 may provide one or more configuration signals to PWM controller 340 based at least on the digital values, associated with voltages of output 360, from ADC 370. In one or more embodiments, controller 330 may include one or more of PWM controller 340, amplifiers 350A-350W, and ADC 370, among others. As illustrated, an input 380 may be coupled to circuitry 140. For example, circuitry 140 may receive input power via input 380.

Figure 3D:
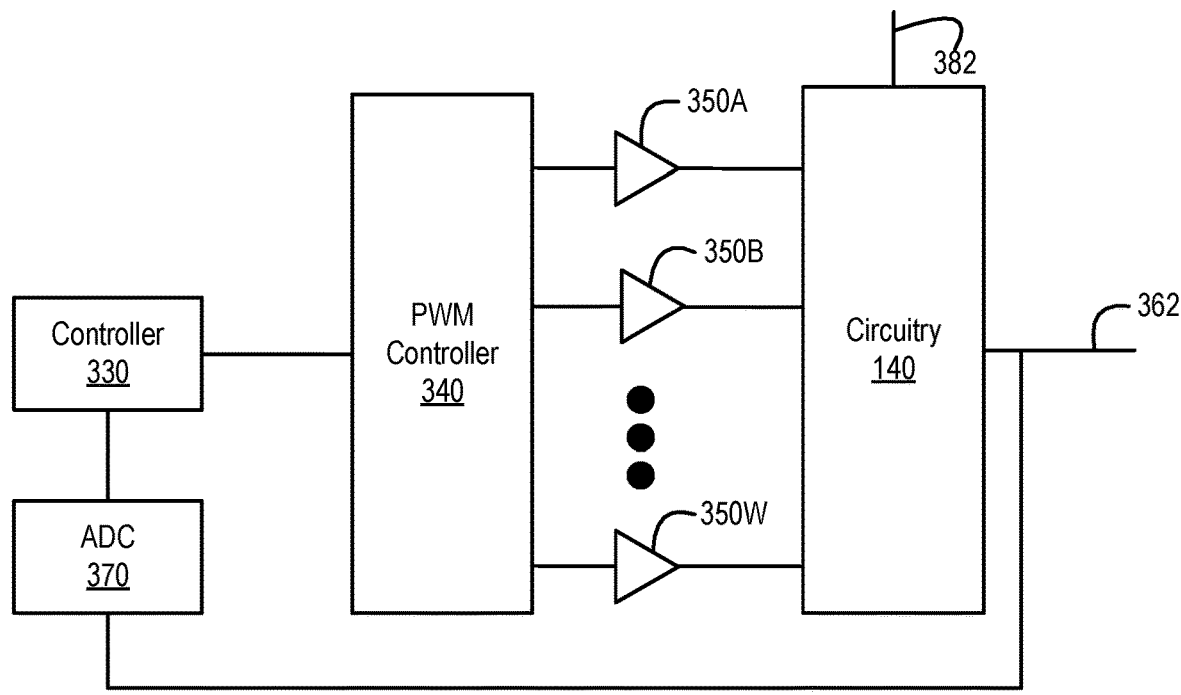
FIG. 3D illustrates an example of components to receive power, according to one or more embodiments.

Turning now to FIG. 3D, an example of a components to receive power is illustrated, according to one or more embodiments. As shown, circuitry 140 may be coupled to an input 362. For example, circuitry 140 may receive power via input 362. In one or more embodiments, input 362 may be coupled to bus 194. In one or more embodiments, bus 194 may include input 362. As illustrated, circuitry 140 may be coupled to an output 382. For example, circuitry 140 may output power via output 382. As shown, ADC 370 may be coupled to input 362. For example, ADC 370 may provide digital values, associated with voltages of input 362, to controller 330. For instance, controller 330 may receive digital values, associated with voltages of input 362, from ADC 370. In one or more embodiments, controller 330 may provide one or more configuration signals to PWM controller 340 based at least on the digital values, associated with voltages of input 362, from ADC 370.

Figure 4A:
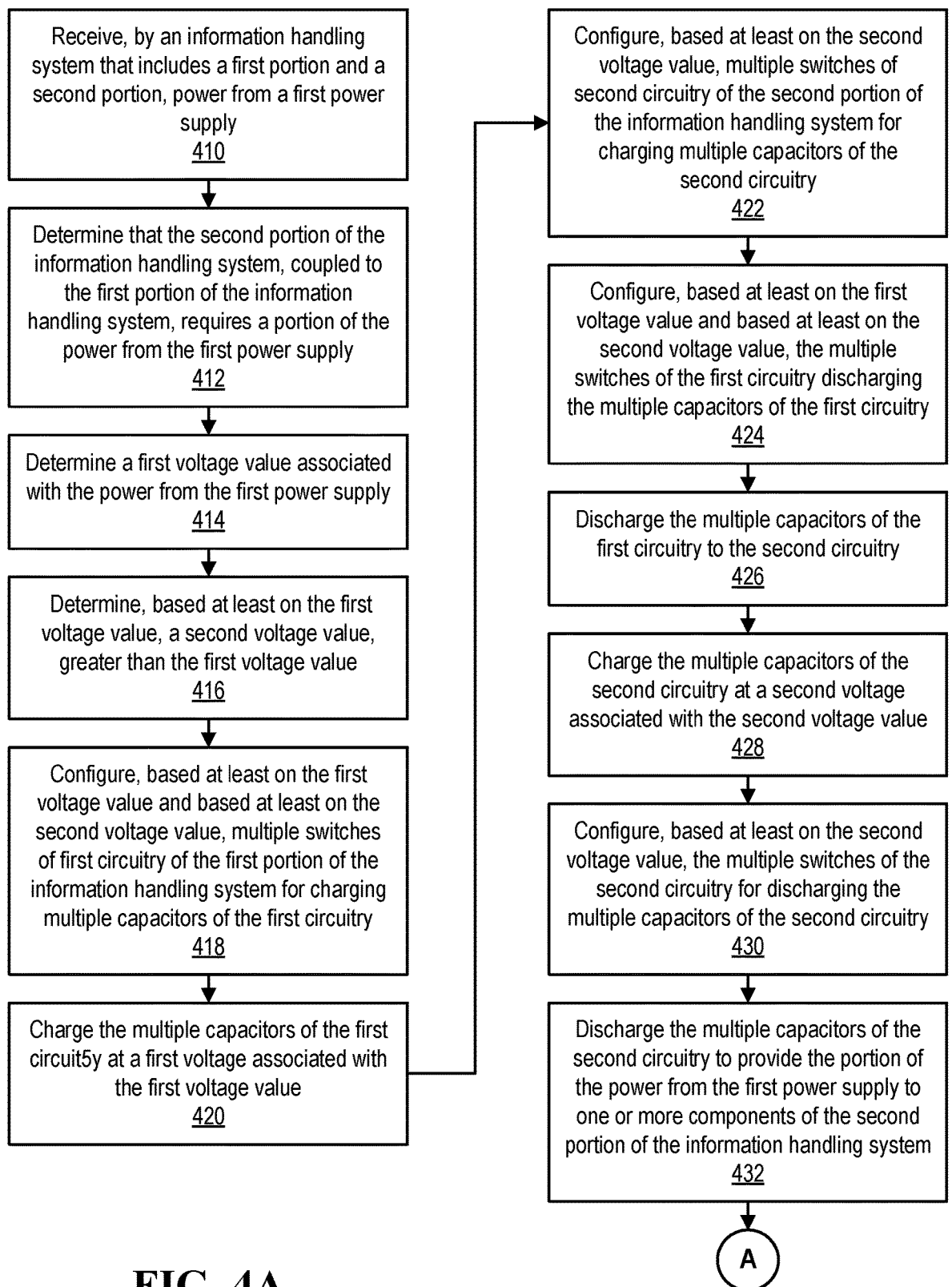
FIGS. 4A and 4B illustrate an example of a method of operating an information handling system is illustrated, according to one or more embodiments.
Figure 4B:
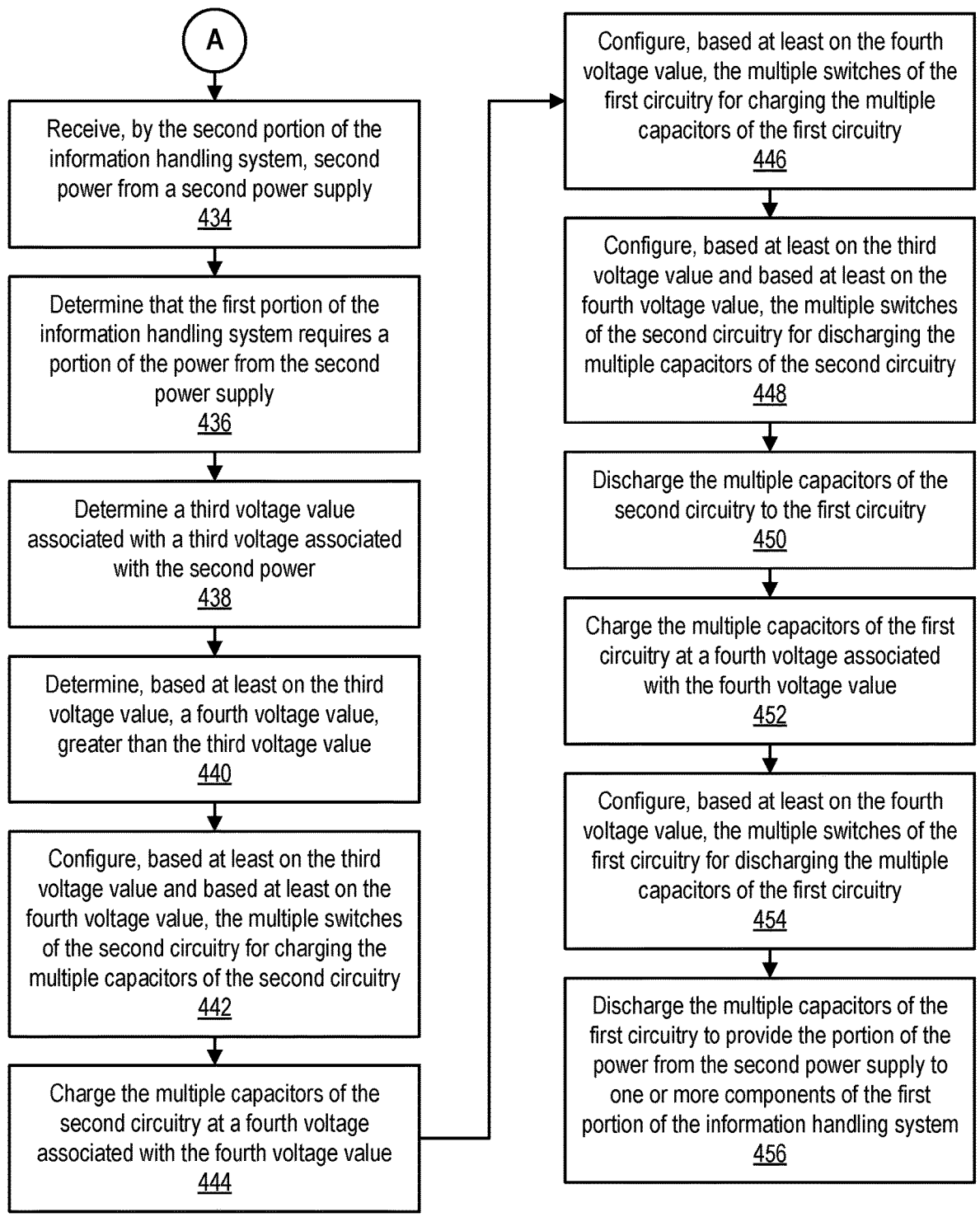

Turning now to FIGS. 4A and 4B, an example of a method of operating an information handling system is illustrated, according to one or more embodiments. At 410, an information handling system that includes a first portion and a second portion may receive power from a first power supply. In one example, the information handling system may include the first power supply. For instance, the first portion of the information handling system may include the first power supply. As an example, the first power supply may include battery 192A. In another example, the first power supply may be external to the information handling system. For instance, the first power supply may be coupled to port 132A.

At 412, it may be determined that the second portion of the information handling system, coupled to the first portion of the information handling system, requires a portion of the power from the first power supply. At 414, a first voltage value associated with the power from the first power supply may be determined. At 416, a second voltage value, greater than the first voltage value, may be determined based at least on the first voltage value.

At 418, multiple switches of first circuitry of the first portion of the information handling system may be configured, based at least on the first voltage value and based at least on the second voltage value, for charging multiple capacitors of the first circuitry. For example, multiple of switches S1-S23 of circuitry 140A of portion 112A of IHS 110 may be configured, based at least on the first voltage value and based at least on the second voltage value, for charging multiple of capacitors C7-C10 of circuitry 140A. In one or more embodiments, multiple switches of first circuitry of the first portion of the information handling system may be configured, based at least on the first voltage value and based at least on the second voltage value, for charging multiple capacitors of the first circuitry in parallel. For example, multiple of switches S1-S23 of circuitry 140A of portion 112A of IHS 110 may be configured, based at least on the first voltage value and based at least on the second voltage value, for charging multiple of capacitors C7-C10 of circuitry 140A in parallel.

At 420, the multiple capacitors of the first circuitry may be charged at a first voltage associated with the first voltage value. For example, the multiple of capacitors C7-C10 of circuitry 140A may be charged at a first voltage associated with the first voltage value. In one or more embodiments, the multiple capacitors of the first circuitry may be charged, in parallel, at a first voltage associated with the first voltage value. For example, the multiple of capacitors C7-C10 of circuitry 140A may be charged, in parallel, at a first voltage associated with the first voltage value.

At 422, multiple switches of second circuitry of the second portion of the information handling system may be configured, based at least on the second voltage value, for charging multiple capacitors of the second circuitry. For example, multiple of switches S1-S23 of circuitry 140B of portion 112B of IHS 110 may be configured, based at least on the second voltage value, for charging multiple of capacitors C7-C10 of circuitry 140B. In one or more embodiments, multiple switches of second circuitry of the second portion of the information handling system may be configured, based at least on the second voltage value, for charging multiple capacitors of the second circuitry in series. For example, multiple of switches S1-S23 of circuitry 140B of portion 112B of IHS 110 may be configured, based at least on the second voltage value, for charging multiple of capacitors C7-C10 of circuitry 140B in series.

At 424, the multiple switches of the first circuitry may be configured, based at least on the first voltage value and based at least on the second voltage value, for discharging the multiple capacitors of the first circuitry. For example, the multiple of switches S1-S23 of circuitry 140A may be configured, based at least on the first voltage value and based at least on the second voltage value, for discharging the multiple of capacitors C7-C10 of circuitry 140A. In one or more embodiments, the multiple switches of the first circuitry may be configured, based at least on the first voltage value and based at least on the second voltage value, for discharging the multiple capacitors of the first circuitry in series. For example, the multiple of switches S1-S23 of circuitry 140A may be configured, based at least on the first voltage value and based at least on the second voltage value, for discharging the multiple of capacitors C7-C10 of circuitry 140A in series.

At 426, the multiple capacitors of the first circuitry may be discharged to the second circuitry. For example, the multiple of capacitors C7-C10 of circuitry 140A may be discharged to circuitry 140B. In one or more embodiments, the multiple capacitors of the first circuitry may be discharged, in series, to the second circuitry. For example, the multiple of capacitors C7-C10 of circuitry 140A may be discharged, in series, to circuitry 140B.

At 428, the multiple capacitors of the second circuitry may be charged at a second voltage associated with the second voltage value. For example, the multiple of capacitors C7-C10 of circuitry 140B may be charged at a second voltage associated with the second voltage value. In one or more embodiments, the multiple capacitors of the second circuitry may be charged, in series, at a second voltage associated with the second voltage value. For example, the multiple of capacitors C7-C10 of circuitry 140B may be charged, in series, at a second voltage associated with the second voltage value.

At 430, the multiple switches of the second circuitry may be configured, based at least on the second voltage value, for discharging the multiple capacitors of the second circuitry. For example, the multiple of switches S1-S23 of circuitry 140B may be configured, based at least on the second voltage value, for discharging the multiple of capacitors C7-C10 of circuitry 140B. In one or more embodiments, the multiple switches of the second circuitry may be configured, based at least on the second voltage value, for discharging the multiple capacitors of the second circuitry in parallel. For example, the multiple of switches S1-S23 of circuitry 140B may be configured, based at least on the second voltage value, for discharging the multiple of capacitors C7-C10 of circuitry 140B in parallel.

At 432, the multiple capacitors of the second circuitry may be discharged to provide the portion of the power from the first power supply to one or more components of the second portion of the information handling system. For example, the multiple of capacitors C7-C10 of circuitry 140B may be discharged to provide the portion of the power from the first power supply to one or more components of portion 112B of IHS 110. In one or more embodiments, the multiple capacitors of the second circuitry may be discharged, in parallel, to provide the portion of the power from the first power supply to one or more components of the second portion of the information handling system. For example, the multiple of capacitors C7-C10 of circuitry 140B may be discharged, in parallel, to provide the portion of the power from the first power supply to one or more components of portion 112B of IHS 110.

At 434, the second portion of the information handling system may receive second power from a second power supply. In one example, the information handling system may include the second power supply. For instance, the second portion of the information handling system may include the second power supply. As an example, the second power supply may include battery 192B. In another example, the second power supply may be external to the information handling system. For instance, the second power supply may be coupled to port 132B.

At 436, it may be determined that the first portion of the information handling system requires a portion of the power from the second power supply. At 438, a third voltage value associated with a third voltage associated with the second power may be determined. In one example, the third voltage value may be the first voltage value. In another example, the third voltage value may be different from the first voltage value. At 440, a fourth voltage value, greater than the third voltage value, may be determined based at least on the third voltage value.

At 442, the multiple switches of the second circuitry may be configured, least on the third voltage value and based at least on the fourth voltage value, for charging the multiple capacitors of the second circuitry. For example, the multiple of switches S1-S23 of circuitry 140B may be configured, least on the third voltage value and based at least on the fourth voltage value, for charging the multiple of capacitors C7-C10 of circuitry 140B. In one or more embodiments, the multiple switches of the second circuitry may be configured, least on the third voltage value and based at least on the fourth voltage value, for charging the multiple capacitors of the second circuitry in parallel. For example, the multiple of switches S1-S23 of circuitry 140B may be configured, least on the third voltage value and based at least on the fourth voltage value, for charging the multiple of capacitors C7-C10 of circuitry 140B in parallel.

At 444, the multiple capacitors of the second circuitry may be charged at a fourth voltage associated with the fourth voltage value. For example, the multiple of C7-C10 of circuitry 140B may be charged at a fourth voltage associated with the fourth voltage value. In one or more embodiments, the multiple capacitors of the second circuitry may be charged, in parallel, at a fourth voltage associated with the fourth voltage value. For example, the multiple of C7-C10 of circuitry 140B may be charged, in parallel, at a fourth voltage associated with the fourth voltage value.

At 446, the multiple switches of the first circuitry may be configured, based at least on the fourth voltage value, for charging the multiple capacitors of the first circuitry. For example, the multiple of switches S1-S23 of circuitry 140A may be configured, based at least on the fourth voltage value, for charging the multiple of capacitors C7-C10 of circuitry 140A. In one or more embodiments, the multiple switches of the first circuitry may be configured, based at least on the fourth voltage value, for charging the multiple capacitors of the first circuitry in series. For example, the multiple of switches S1-S23 of circuitry 140A may be configured, based at least on the fourth voltage value, for charging the multiple of capacitors C7-C10 of circuitry 140A in series.

At 448, the multiple switches of the second circuitry may be configured, based at least on the third voltage value and based at least on the fourth voltage value, for discharging the multiple capacitors of the second circuitry. For example, the multiple of switches of circuitry 140B may be configured, based at least on the third voltage value and based at least on the fourth voltage value, for discharging the multiple of capacitors C7-C10 of circuitry 140B. In one or more embodiments, the multiple switches of the second circuitry may be configured, based at least on the third voltage value and based at least on the fourth voltage value, for discharging the multiple capacitors of the second circuitry in series. For example, the multiple of switches of circuitry 140B may be configured, based at least on the third voltage value and based at least on the fourth voltage value, for discharging the multiple of capacitors C7-C10 of circuitry 140B in series.

At 450, the multiple capacitors of the second circuitry may be discharged to the first circuitry. For example, the multiple of capacitors C7-C10 of circuitry 140B may be discharged to circuitry 140A. In one or more embodiments, the multiple capacitors of the second circuitry may be discharged, in series, to the first circuitry. For example, the multiple of capacitors C7-C10 of circuitry 140B may be discharged, in series, to circuitry 140A.

At 452, the multiple capacitors of the first circuitry may be charged at a fourth voltage associated with the fourth voltage value. For example, the multiple of capacitors C7-C10 of circuitry 140A may be charged at a fourth voltage associated with the fourth voltage value. In one or more embodiments, the multiple capacitors of the first circuitry may be charged, in series, at a fourth voltage associated with the fourth voltage value. For example, the multiple of capacitors C7-C10 of circuitry 140A may be charged, in series, at a fourth voltage associated with the fourth voltage value.

At 454, the multiple switches of the first circuitry may be configured, based at least on the fourth voltage value, for discharging the multiple capacitors of the first circuitry. For example, the multiple of switches S1-S23 of circuitry 140A may be configured, based at least on the third voltage value, for discharging the multiple of capacitors C7-C10 of circuitry 140A. In one or more embodiments, the multiple switches of the first circuitry may be configured, based at least on the third voltage value, for discharging the multiple capacitors of the first circuitry in parallel. For example, the multiple of switches S1-S23 of circuitry 140A may be configured, based at least on the third voltage value, for discharging the multiple of capacitors C7-C10 of circuitry 140A in parallel.

At 456, the multiple capacitors of the first circuitry may be discharged to provide the portion of the power from the second power supply to one or more components of the first portion of the information handling system. For example, the multiple of C7-C10 of circuitry 140A may be discharged to provide the portion of the power from the second power supply to one or more components of portion 112A of IHS 110. In one or more embodiments, the multiple capacitors of the first circuitry may be discharged, in parallel, to provide the portion of the power from the second power supply to one or more components of the first portion of the information handling system. For example, the multiple of C7-C10 of circuitry 140A may be discharged, in parallel, to provide the portion of the power from the second power supply to one or more components of portion 112A of IHS 110.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a first portion that includes a first processor, a first memory medium coupled to the first processor, an embedded controller, and first circuitry;
   a second portion, coupled to the first portion via a bus, that includes a display and second circuitry;
   wherein the first memory medium stores first instructions executable by the first processor;
   wherein the embedded controller includes a second processor and second memory medium coupled to the processor that stores second instructions executable by the second processor;
   wherein the information handling system is configured to receive power from a first power supply;

wherein, when the second processor executes the second instructions, the second instructions cause the embedded controller to:
  determine that the second portion of the information handling system requires a portion of the power from the first power supply;
  determine a first voltage value associated with the power from the first power supply;
  determine, based at least on the first voltage value, a second voltage value, greater than the first voltage value;
  configure, based at least on the first voltage value and based at least on the second voltage value, a plurality of switches of the first circuitry of the first portion of the information handling system for charging a plurality of capacitors of the first circuitry;
  charge the plurality of capacitors of the first circuitry at a first voltage associated with the first voltage value;
  configure, based at least on the second voltage value, a plurality of switches of the second circuitry of the second portion of the information handling system for charging a plurality of capacitors of the second circuitry;
  configure, based at least on the first voltage value and based at least on the second voltage value, the plurality of switches of the first circuitry for discharging the plurality of capacitors of the first circuitry;
  discharge the plurality of capacitors of the first circuitry to the second circuitry;
  charge the plurality of capacitors of the second circuitry at a second voltage associated with the second voltage value;
  configure, based at least on the second voltage value, the plurality of switches of the second circuitry for discharging the plurality of capacitors of the second circuitry; and
  discharge the plurality of capacitors of the second circuitry to provide the portion of the power from the first power supply to one or more components of the second portion of the information handling system.

2. The information handling system of claim 1,
wherein, to configure, based at least on the second voltage value, the plurality of switches of the second circuitry for discharging the plurality of capacitors of the second circuitry is further based at least on a third voltage value, less than the second voltage value; and
wherein, to discharge the plurality of capacitors of the second circuitry to provide the portion of the power from the first power supply to the one or more components of the second portion of the information handling system, the second instructions further cause the embedded controller to discharge the plurality of capacitors of the second circuitry to provide the portion of the power from the first power supply at a third voltage associated with the third voltage value.

3. The information handling system of claim 2, wherein the third voltage value is the first voltage value.

4. The information handling system of claim 1, wherein the one or more components of the second portion of the information handling system includes a second power supply that includes a battery.

5. The information handling system of claim 1,
wherein, to configure, based at least on the first voltage value and based at least on the second voltage value, the plurality of switches of the first circuitry of the first portion of the information handling system for charging the plurality of capacitors of the first circuitry, the second instructions further cause the embedded controller to configure the plurality of switches of the first circuitry for charging the plurality of capacitors of the first circuitry in parallel;
wherein, to configure, based at least on the second voltage value, the plurality of switches of the second circuitry of the second portion of the information handling system for charging the plurality of capacitors of the second circuitry, the second instructions further cause the embedded controller to configure the plurality of switches of the second circuitry for charging the plurality of capacitors of the second circuitry in series; and
wherein, to configure, based at least on the second voltage value, the plurality of switches of the second circuitry for discharging the plurality of capacitors of the second circuitry, the second instructions further cause the embedded controller to configure the plurality of switches of the second circuitry for discharging the plurality of capacitors of the second circuitry in parallel.

6. The information handling system of claim 1,
wherein the first power supply includes a battery; and
wherein the first portion of the information handling system includes the first power supply.

7. The information handling system of claim 1, wherein the first power supply is external to the information handling system.

8. The information handling system of claim 1,
wherein the information handling system is further configured to receive, by the second portion of the information handling system, second power from a second power supply; and
wherein the second instructions further cause the embedded controller to:
  determine that the first portion of the information handling system requires a portion of the power from the second power supply;
  determine a third voltage value associated with a third voltage associated with the second power;
  determine, based at least on the third voltage value, a fourth voltage value, greater than the third voltage value;
  configure, based at least on the third voltage value and based at least on the fourth voltage value, the plurality of switches of the second circuitry for charging the plurality of capacitors of the second circuitry;
  charge the plurality of capacitors of the second circuitry at a fourth voltage associated with the fourth voltage value;
  configure, based at least on the fourth voltage value, the plurality of switches of the first circuitry for charging the plurality of capacitors of the first circuitry;
  configure, based at least on the third voltage value and based at least on the fourth voltage value, the plurality of switches of the second circuitry for discharging the plurality of capacitors of the second circuitry;
  discharge the plurality of capacitors of the second circuitry to the first circuitry;
  charge the plurality of capacitors of the first circuitry at a fourth voltage associated with the fourth voltage value;
  configure, based at least on the fourth voltage value, the plurality of switches of the first circuitry for discharging the plurality of capacitors of the first circuitry; and discharge the plurality of capacitors of the first circuitry to provide the portion of the power from the second power supply to one or more components of the first portion of the information handling system.

9. A method, comprising:
receiving, by an information handling system that includes a first portion and a second portion, power from a first power supply;
determining that the second portion of the information handling system, coupled to the first portion of the information handling system, requires a portion of the power from the first power supply;
determining a first voltage value associated with the power from the first power supply;
determining, based at least on the first voltage value, a second voltage value, greater than the first voltage value;
configuring, based at least on the first voltage value and based at least on the second voltage value, a plurality of switches of first circuitry of the first portion of the information handling system for charging a plurality of capacitors of the first circuitry;
charging the plurality of capacitors of the first circuitry at a first voltage associated with the first voltage value;
configuring, based at least on the second voltage value, a plurality of switches of second circuitry of the second portion of the information handling system for charging a plurality of capacitors of the second circuitry;
configuring, based at least on the first voltage value and based at least on the second voltage value, the plurality of switches of the first circuitry for discharging the plurality of capacitors of the first circuitry;
discharging the plurality of capacitors of the first circuitry to the second circuitry;
charging the plurality of capacitors of the second circuitry at a second voltage associated with the second voltage value;
configuring, based at least on the second voltage value, the plurality of switches of the second circuitry for discharging the plurality of capacitors of the second circuitry; and
discharging the plurality of capacitors of the second circuitry to provide the portion of the power from the first power supply to one or more components of the second portion of the information handling system.

10. The method of claim 9,
wherein the configuring, based at least on the second voltage value, the plurality of switches of the second circuitry for discharging the plurality of capacitors of the second circuitry is further based at least on a third voltage value, less than the second voltage value; and
wherein the discharging the plurality of capacitors of the second circuitry to provide the portion of the power from the first power supply to the one or more components of the second portion of the information handling system includes discharging the plurality of capacitors of the second circuitry to provide the portion of the power from the first power supply at a third voltage associated with the third voltage value.

11. The method of claim 10, wherein the third voltage value is the first voltage value.

12. The method of claim 9, wherein the one or more components of the second portion of the information handling system includes a second power supply that includes a battery.

13. The method of claim 9,
wherein the configuring, based at least on the first voltage value and based at least on the second voltage value, the plurality of switches of the first circuitry of the first portion of the information handling system for charging the plurality of capacitors of the first circuitry includes configuring the plurality of switches of the first circuitry for charging the plurality of capacitors of the first circuitry in parallel;
wherein the configuring, based at least on the second voltage value, the plurality of switches of the second circuitry of the second portion of the information handling system for charging the plurality of capacitors of the second circuitry includes configuring the plurality of switches of the second circuitry for charging the plurality of capacitors of the second circuitry in series; and
wherein the configuring, based at least on the second voltage value, the plurality of switches of the second circuitry for discharging the plurality of capacitors of the second circuitry includes configuring the plurality of switches of the second circuitry for discharging the plurality of capacitors of the second circuitry in parallel.

14. The method of claim 9,
wherein the first power supply includes a battery; and
wherein the first portion of the information handling system includes the first power supply.

15. The method of claim 9, wherein the first power supply is external to the information handling system.

16. The method of claim 9, further comprising:
receiving, by the second portion of the information handling system, second power from a second power supply;
determining that the first portion of the information handling system requires a portion of the power from the second power supply;
determining a third voltage value associated with a third voltage associated with the second power;
determining, based at least on the third voltage value, a fourth voltage value, greater than the third voltage value;
configuring, based at least on the third voltage value and based at least on the fourth voltage value, the plurality of switches of the second circuitry for charging the plurality of capacitors of the second circuitry;
charging the plurality of capacitors of the second circuitry at a fourth voltage associated with the fourth voltage value;
configuring, based at least on the fourth voltage value, the plurality of switches of the first circuitry for charging the plurality of capacitors of the first circuitry;
configuring, based at least on the third voltage value and based at least on the fourth voltage value, the plurality of switches of the second circuitry for discharging the plurality of capacitors of the second circuitry;
discharging the plurality of capacitors of the second circuitry to the first circuitry;
charging the plurality of capacitors of the first circuitry at a fourth voltage associated with the fourth voltage value;
configuring, based at least on the fourth voltage value, the plurality of switches of the first circuitry for discharging the plurality of capacitors of the first circuitry; and
discharging the plurality of capacitors of the first circuitry to provide the portion of the power from the second power supply to one or more components of the first portion of the information handling system.

17. An embedded controller, comprising:
a processor; and
a memory medium, coupled to the processor, that stores instructions executable by the processor, which when executed by the processor, cause the embedded controller to:
receive, by an information handling system, power from a first power supply, wherein the information handling system includes the embedded controller, a first portion and a second portion;
determine that the second portion of the information handling system requires a portion of the power from the first power supply;
determine a first voltage value associated with the power from the first power supply;
determine, based at least on the first voltage value, a second voltage value, greater than the first voltage value;
configure, based at least on the first voltage value and based at least on the second voltage value, a plurality of switches of first circuitry of the first portion of the information handling system for charging a plurality of capacitors of the first circuitry;
charge the plurality of capacitors of the first circuitry at a first voltage associated with the first voltage value;
configure, based at least on the second voltage value, a plurality of switches of second circuitry of the second portion of the information handling system for charging a plurality of capacitors of the second circuitry;
configuring, based at least on the first voltage value and based at least on the second voltage value, the plurality of switches of the first circuitry for discharging the plurality of capacitors of the first circuitry;
discharge the plurality of capacitors of the first circuitry to the second circuitry;
charge the plurality of capacitors of the second circuitry at a second voltage associated with the second voltage value;
configure, based at least on the second voltage value, the plurality of switches of the second circuitry for discharging the plurality of capacitors of the second circuitry; and
discharge the plurality of capacitors of the second circuitry to provide the portion of the power from the first power supply to one or more components of the second portion of the information handling system.

18. The embedded controller of claim 17,
wherein, to configure, based at least on the second voltage value, the plurality of switches of the second circuitry for discharging the plurality of capacitors of the second circuitry is further based at least on a third voltage value, less than the second voltage value; and
wherein, to discharge the plurality of capacitors of the second circuitry to provide the portion of the power from the first power supply to the one or more components of the second portion of the information handling system, the instructions further cause the embedded controller to discharge the plurality of capacitors of the second circuitry to provide the portion of the power from the first power supply at a third voltage associated with the third voltage value.

19. The embedded controller of claim 17,
wherein, to configure, based at least on the first voltage value and based at least on the second voltage value, the plurality of switches of the first circuitry of the first portion of the information handling system for charging the plurality of capacitors of the first circuitry, the second instructions further cause the embedded controller to configure the plurality of switches of the first circuitry for charging the plurality of capacitors of the first circuitry in parallel;
wherein, to configure, based at least on the second voltage value, the plurality of switches of the second circuitry of the second portion of the information handling system for charging the plurality of capacitors of the second circuitry, the second instructions further cause the embedded controller to configure the plurality of switches of the second circuitry for charging the plurality of capacitors of the second circuitry in series; and
wherein, to configure, based at least on the second voltage value, the plurality of switches of the second circuitry for discharging the plurality of capacitors of the second circuitry, the second instructions further cause the embedded controller to configure the plurality of switches of the second circuitry for discharging the plurality of capacitors of the second circuitry in parallel.

20. The embedded controller of claim 17, wherein the instructions further cause the embedded controller to:
receive, by the second portion of the information handling system, second power from a second power supply;
determine that the first portion of the information handling system requires a portion of the power from the second power supply;
determine a third voltage value associated with a third voltage associated with the second power;
determine, based at least on the third voltage value, a fourth voltage value, greater than the third voltage value;
configure, based at least on the third voltage value and based at least on the fourth voltage value, the plurality of switches of the second circuitry for charging the plurality of capacitors of the second circuitry;
charge the plurality of capacitors of the second circuitry at a fourth voltage associated with the fourth voltage value;
configure, based at least on the fourth voltage value, the plurality of switches of the first circuitry for charging the plurality of capacitors of the first circuitry;
configure, based at least on the third voltage value and based at least on the fourth voltage value, the plurality of switches of the second circuitry for discharging the plurality of capacitors of the second circuitry;
discharge the plurality of capacitors of the second circuitry to the first circuitry;
charge the plurality of capacitors of the first circuitry at a fourth voltage associated with the fourth voltage value;
configure, based at least on the fourth voltage value, the plurality of switches of the first circuitry for discharging the plurality of capacitors of the first circuitry; and
discharge the plurality of capacitors of the first circuitry to provide the portion of the power from the second power supply to one or more components of the first portion of the information handling system.

* * * * *